United States Patent
Su et al.

(10) Patent No.: US 9,072,128 B2
(45) Date of Patent: Jun. 30, 2015

(54) LIGHT-EMITTING DIODE DRIVING CIRCUITS AND DRIVING METHODS THEREOF

(71) Applicant: Princeton Technology Corporation, New Taipei (TW)

(72) Inventors: Ching-Piao Su, New Taipei (TW); Chiung-Hung Chen, New Taipei (TW); Chien-Te Hsu, New Taipei (TW)

(73) Assignee: Princeton Technology Corporation, New Taipei (TW)

( * ) Notice: Subject to any disclaimer, the term of this patent is extended or adjusted under 35 U.S.C. 154(b) by 0 days.

(21) Appl. No.: 14/039,306

(22) Filed: Sep. 27, 2013

(65) Prior Publication Data
US 2014/0184090 A1 Jul. 3, 2014

(30) Foreign Application Priority Data

Dec. 27, 2012 (TW) .............................. 101150403 A (51) Int. Cl.
*H05B 37/02* (2006.01)

(52) U.S. Cl.
CPC *H05B 37/02* (2013.01); *Y02B 20/42* (2013.01)

(58) Field of Classification Search
USPC ......... 315/307, 250, 312, 194, 360, 291, 293;
332/109; 345/204, 102; 327/172, 175,
327/114, 3, 31, 35, 36
See application file for complete search history.

(56) References Cited

U.S. PATENT DOCUMENTS

| | | | | |
|---|---|---|---|---|
| 6,633,273 B2 * | 10/2003 | Ikeda et al. | ...................... | 345/99 |
| 7,202,607 B2 * | 4/2007 | Kazar et al. | ................ | 315/185 S |
| 7,471,276 B2 * | 12/2008 | Tomohara | ........................ | 345/98 |
| 7,843,148 B2 * | 11/2010 | Gater et al. | .................... | 315/291 |
| 8,169,150 B2 * | 5/2012 | Peker et al. | ................... | 315/246 |
| 8,188,679 B2 * | 5/2012 | Hoogzaad | .................... | 315/294 |
| 8,476,843 B2 * | 7/2013 | Yu et al. | ......................... | 315/294 |
| 8,552,971 B2 * | 10/2013 | Ishikawa et al. | .............. | 345/102 |
| 2001/0052827 A1 * | 12/2001 | Sugita et al. | .................. | 332/109 |
| 2007/0273678 A1 * | 11/2007 | Okita et al. | .................... | 345/204 |
| 2008/0239166 A1 * | 10/2008 | Isono | ............................ | 348/731 |
| 2011/0032008 A1 * | 2/2011 | Zhao et al. | ..................... | 327/114 |
| 2013/0038591 A1 * | 2/2013 | Yang | ............................. | 345/211 |
| 2013/0063042 A1 * | 3/2013 | Bora et al. | ..................... | 315/292 |
| 2013/0088172 A1 * | 4/2013 | Kikuchi et al. | ............... | 315/307 |
| 2013/0257827 A1 * | 10/2013 | Hsieh et al. | .................... | 345/204 |
| 2014/0184090 A1 * | 7/2014 | Su et al. | ......................... | 315/250 |
| 2014/0184105 A1 * | 7/2014 | Su et al. | ......................... | 315/312 |

* cited by examiner

*Primary Examiner* — Thuy Vinh Tran
*Assistant Examiner* — Syed M Kaiser
(74) *Attorney, Agent, or Firm* — Muncy, Geissler, Olds & Lowe, P.C.

(57) ABSTRACT

A driving circuit includes a first PWM driving module and a second PWM driving module. The first PWM driving module generates a first square-wave signal to drive a first illumination unit according to a first data signal of a data stream, wherein the first square-wave represents an illumination period of the first illumination unit in a display cycle. The second PWM driving module generates a second square-wave signal to drive the second illumination unit according to a second data signal of the data stream, wherein the second square-wave signal, which has a different phase with the first square-wave signal, represents an illumination period of the second illumination unit in the display cycle.

17 Claims, 9 Drawing Sheets

LIGHT-EMITTING DIODE DRIVING CIRCUITS AND DRIVING METHODS THEREOF

CROSS REFERENCE TO RELATED APPLICATIONS

This Application claims priority of Taiwan Patent Application No. 101150403, filed on Dec. 27, 2012, the entirety of which is incorporated by reference herein.

BACKGROUND OF THE INVENTION

1. Field of the Invention

The invention is related generally to illumination systems, and more particularly, to driving circuits for use in illumination systems.

2. Description of the Related Art

Figure 1A:
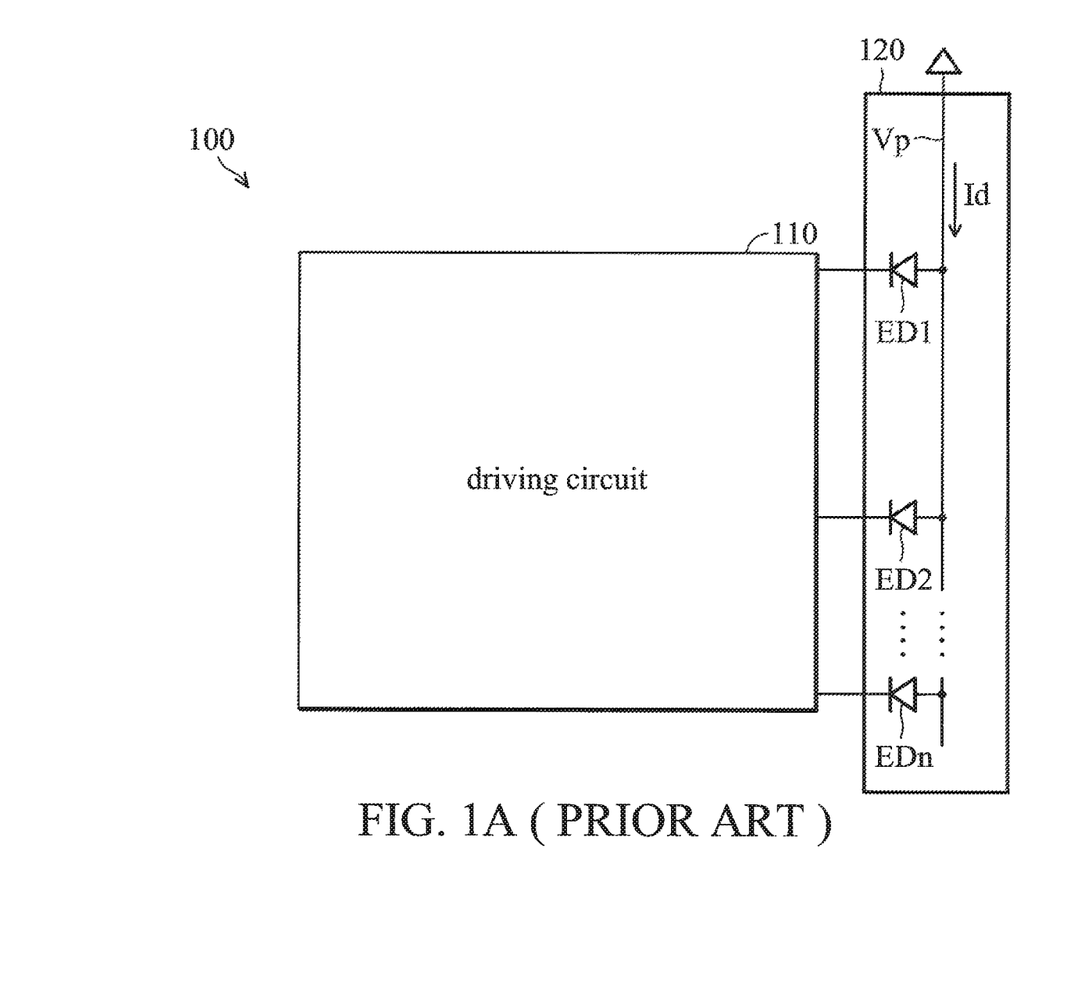
FIG. 1A is a schematic diagram of an illumination system according to the prior art.

FIG. 1A is a schematic diagram of an illumination system. As shown in FIG. 1A, the illumination system 100 includes a driving circuit 110 and an illumination module 120. The driving circuit 110 includes n channels to drive the illumination units ED1~EDn of the illumination module 120, and each of the illumination units ED1~EDn is coupled to the power line Vp.

Figure 1B:
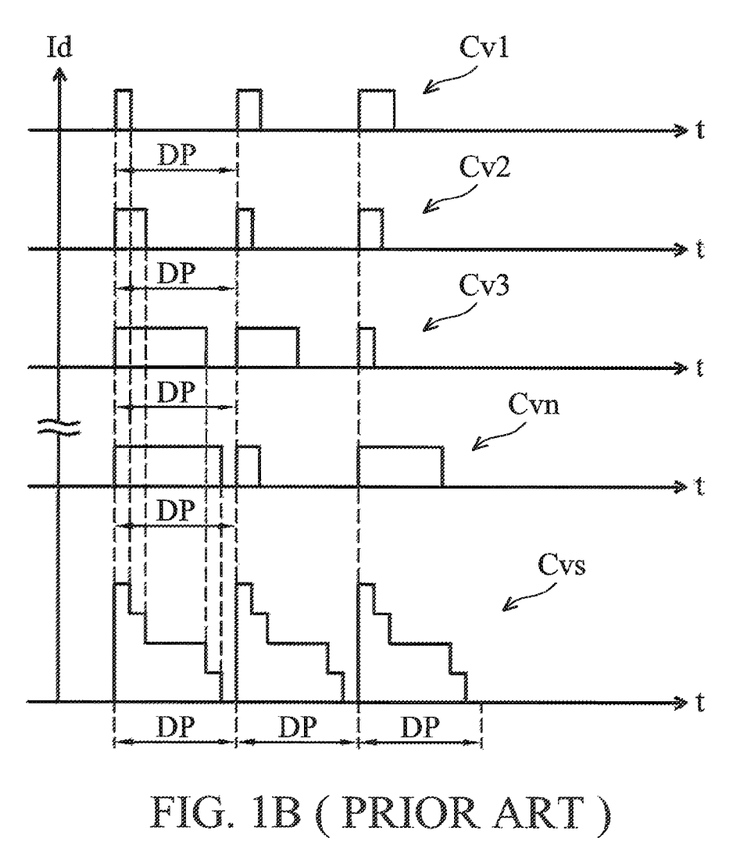
FIG. 1B is a diagram depicting the relationship of the current on the power line versus time according to the prior art.

FIG. 1B is a diagram depicting the relationship of the current on the power line versus time. As shown in FIG. 1B, the waveform Cv1 represents the current of the first channel, the waveform Cv2 represents the current of the second channel, the waveform Cv3 represents the current of the third channel, and the waveform Cvn represents the current of the n-th channel. The waveform Cvs represents the total current of all the current waveforms counting from the waveform Cv1 to the waveform Cvn, which is equivalent to the current of the power line Vp.

Note that since the n channels are simultaneously turned on at the beginning of each display cycle DP, the current of the power line Vp instantly surges from zero to a value which is n times the current value of a single channel. This causes noise to be over-concentrated at the beginning of the display cycle DP. Therefore, a driving circuit and a driving method are needed which can evenly distribute the current of the power line Vp throughout the display cycle DP.

BRIEF SUMMARY OF THE INVENTION

To solve the above problem, the invention provides a driving circuit, comprising: a first PWM driving module, generating a first square-wave signal to drive a first illumination unit according to a first data signal of a data stream, wherein the first square-wave signal represents an illumination period of the first illumination unit in a display cycle; and a second PWM driving module, generating a second square-wave signal to drive a second illumination unit according to a second data signal of the data stream, wherein the second square-wave signal represents an illumination period of the second illumination unit in the display cycle, in which the first square-wave signal has a different phase than the second square-wave signal.

The invention further provides a driving method for driving a first illumination unit and a second illumination unit, comprising: generating a first square-wave signal according to a first data signal of a data stream, wherein the first square-wave signal represents an illumination period of the first illumination unit in a display cycle, and a rising edge of the first square-wave signal is located at the beginning of the display cycle; driving the first illumination unit according to the first square-wave signal; generating a second square-wave signal according to the second data signal of the data stream, wherein the second square-wave signal represents an illumination period of the second illumination unit in the display cycle, in which a falling edge of the second square-wave signal is located at the end of the display cycle and the first square-wave signal has a different phase with the second square-wave signal; and driving the second illumination unit according to the second square-wave signal.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
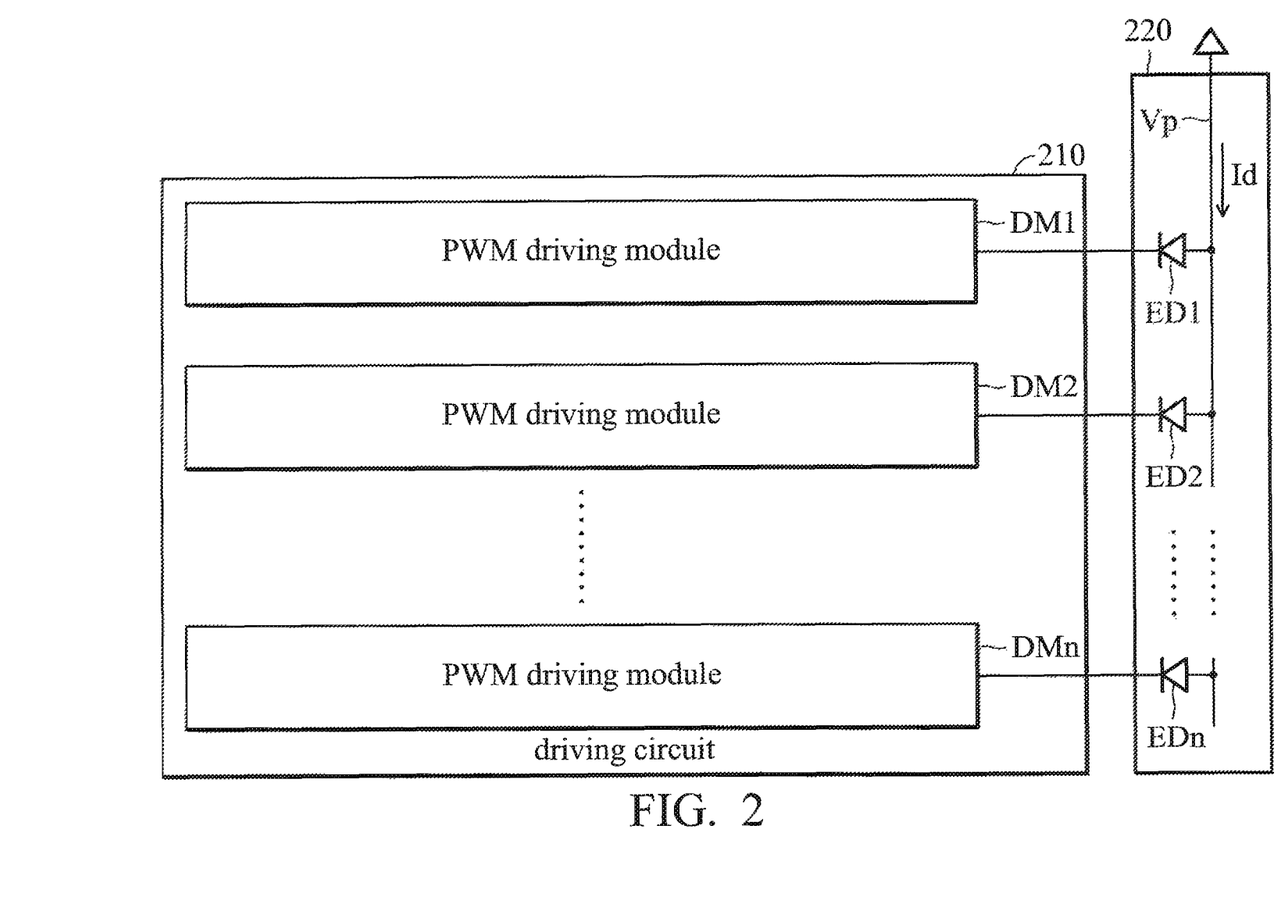
FIG. 2 is a schematic of the driving circuit according to an embodiment of the invention.

FIG. 2 is a schematic of the driving circuit according to an embodiment of the invention. As shown in FIG. 2, the driving circuit 210 includes a plurality of PWM driving modules DM1~DMn which respectively drive one of a plurality of the illumination units ED1~EDn of the illumination module 220. The illumination units ED1~EDn are coupled with each other in parallel, and each of the illumination units ED1~EDn has a first terminal coupled to a power line Vp and a second terminal coupled to a respective one of the PWM driving modules DM1~DMn. According to another embodiment of the invention, the illumination units ED1~EDn of the illumination module 220 can be respectively coupled to a corresponding PWM driving module DM1~DMn by the first terminal and coupled to the ground terminal by the second terminal.

Figure 3:
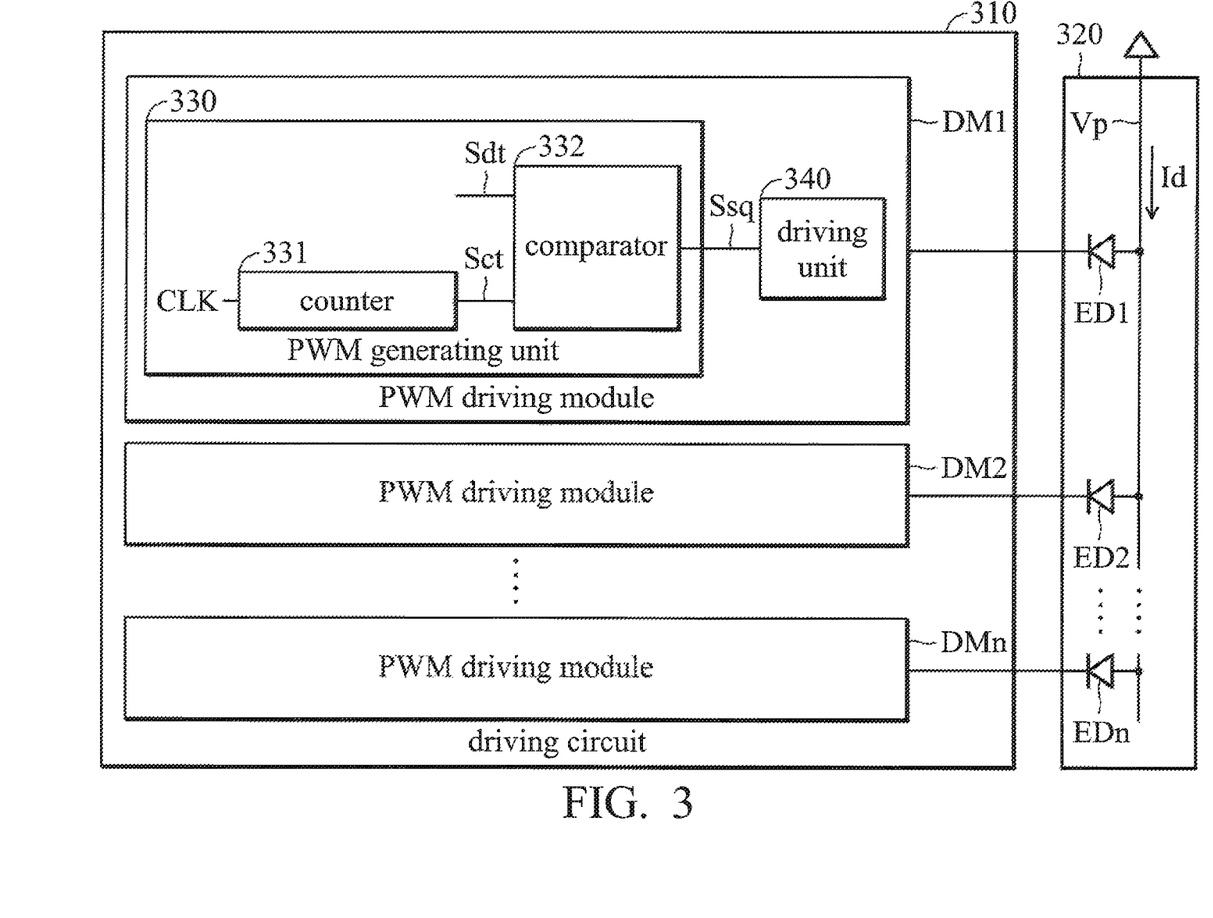
FIG. 3 is a schematic of the PWM driving module according to an embodiment of the invention.

FIG. 3 is a schematic of the PWM driving module according to an embodiment of the invention. A PWM generating unit 330 determines the illumination period of the illumination units ED1~EDn of the illumination module 320 in a display cycle according to the data signal Sdt. The illumination units ED1~EDn are coupled with each other in parallel which could be made up of light-emitting diodes (LEDs). More specifically, as shown in FIG. 3, each PWM driving module DM1~DMn at leas eludes a PWM generating unit 330 and a driving unit 340. The PWM generating unit 330 outputs a square-wave signal Ssq according to the data signal Sdt. The driving unit 340 is coupled to the PWM generating unit 330 for driving the illumination unit ED1 according to the square-wave signal Ssq. The data signal Sdt indicates the duty cycle (the ratio of the illumination period to the display cycle) of the display cycle.

The PWM generating unit 330 at least includes a counter 331 and a comparator 332. The counter 331 counts a clock signal CLK with a corresponding starting value to output a counting signal Sct. For example, when the starting value of the counter 331 is 0 and the counter 331 receives the first pulse of the clock signal CLK, the value of the counting signal Sct is 1 (positive-edge trigger is employed for instance). Similarly, when the counter 331 receives the second pulse of the clock signal CLK, the value of the counting signal Sct is 2. Likewise, when the counter 331 receives the 255-th pulse of the clock signal CLK, the value of the counting signal Sct is 255. When the counter 331 further receives the 256-th pulse of the clock signal CLK, the value of the counting signal Sct is to 0 and the counter 331 is reset. When the starting value of the counter 331 is 2 and the counter 331 receives the first pulse of the clock signal CLK, the value of the counting signal Sct is 3. When the counter 331 receives the second pulse of the clock signal CLK, the value of the counting signal Sct is 4. When the counter 331 receives the 253-th pulse of the clock signal CLK, the value of the counting signal Sct is 255. When the counter 331 receives the 254-th pulse of the clock signal CLK, the value of the counting signal Sct is 0, and the counter 331 is reset, it should be noted that all the counters in the PWM driving modules DM1~DMn can be down counters or all the counters can be up counters.

The comparator 332 generates the square-wave signal Ssq according to the counting signal Sct and the data signal Sdt. According to an embodiment of the invention, the comparator 332 has a positive terminal, which is coupled to the counter 331, and a negative terminal, which is coupled to a PWM register (not shown in FIG. 3), such that the square-wave signal Ssq is at a high voltage level when the counting signal Sct is higher than the data signal Sdt. When the counting signal Sct is lower than the data signal Sdt, the square-wave signal Ssq is at a low voltage level. For example, suppose that the starting value of the counter 331 is 0, the data signal is 04, and the display cycle DP includes 255 time units UT1~UT255. During the time units UT1~UT4, the value of the counting signal Sct is 001~004 (not larger than 004), and the square-wave signal Ssq is thus at a low voltage level. During the time units UT005~UT255, the value of the counting signal Sct is 005~255 (larger than 004), and the square-wave signal Ssq is thus at a high voltage level.

For example, suppose that the starting value of the counter 331 is 2, and the data signal Sdt is 04. During the time units UT1~UT2, the value of the counting signal Sct is 003~004 (not larger than 04), and the square-wave signal Ssq is thus at a low voltage level. During the time units UT3~UT253, the value of the counting signal Sct is 005~255 (larger than 04), and the square-wave signal Ssq is thus at a high voltage level. During the time units UT254~UT256, the value of the counting signal Sct is 000~002 (not larger than 04), and the square-wave signal Ssq is thus at low voltage level.

For example, the illumination module 320 includes the illumination units ED1~ED16, and the driving circuit 310 includes 16 channels, i.e., the PWM driving modules DM1~DM16. The driving module DM1~DM16 can be divided into two groups, where the first group includes the driving modules DM1~DM8, and the second group includes the driving modules DM9~DM16. In addition, the starting value for the first group is 0, and the starting value for the second group is 128. The PWM driving modules DM1~DM16 can be divided into three groups as well, where the first group includes the PWM driving modules DM1~DM5, the second group includes the PWM driving modules DM6~DM10, and the third group includes the PWM driving modules DM11~DM16. In addition, the starting value, for the first group is 0, the starting value for the second group is 90, and the starting value for the third group is 180. In other words, if the driving circuit 310 includes n channels, the PWM driving modules DM1~DMn can be divided into m groups (m≤n), and the starting value for each group is ranged between 0 and 255.

Figure 4:
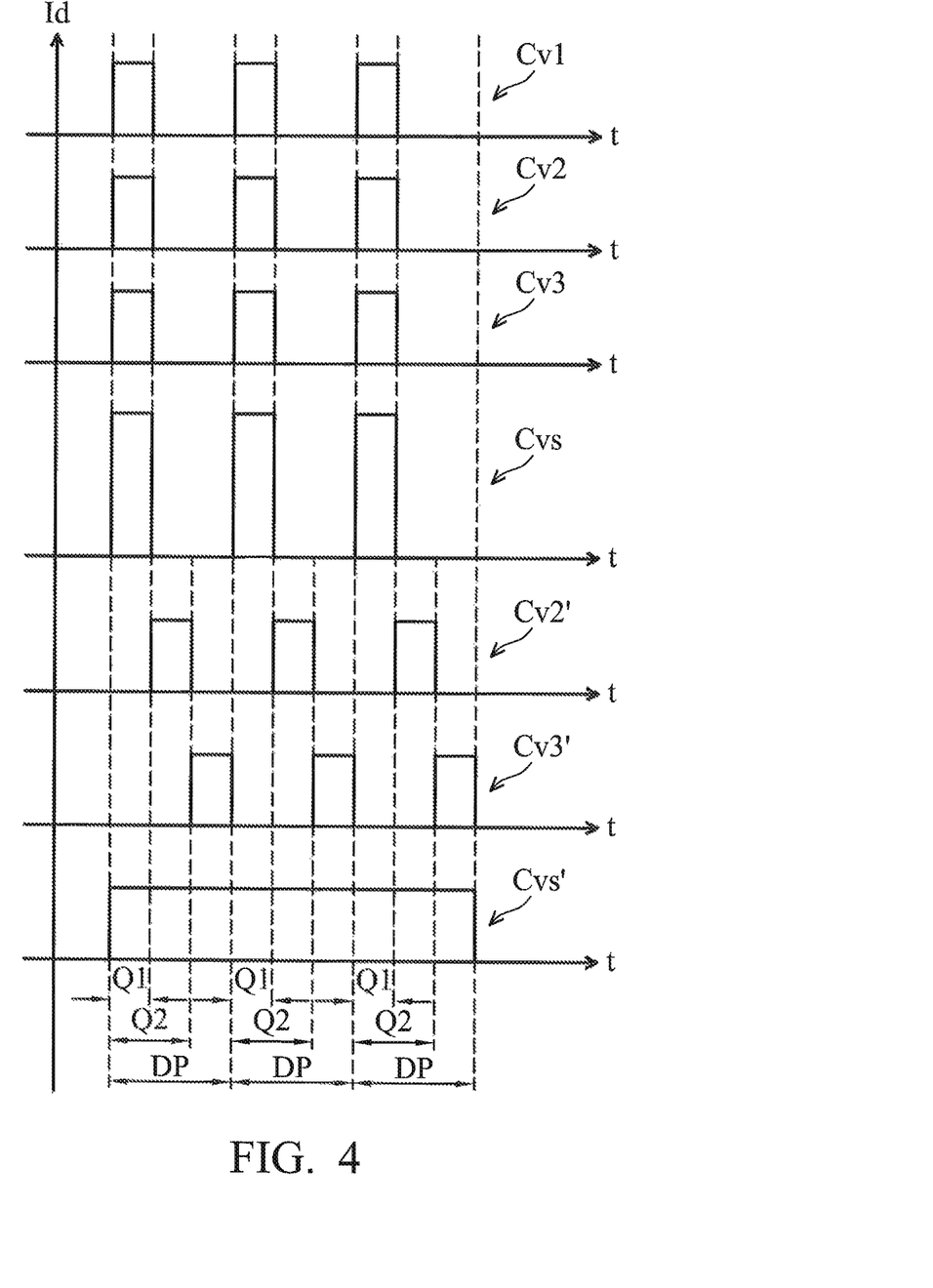
FIG. 4 is a diagram depicting the relationship of the current on the power line versus time according to an embodiment of the invention.

FIG. 4 is a diagram depicting the relationship of the current on the power line versus time according to an embodiment of the invention. According to the PWM driving method, the current waveforms shown in FIG. 4 are in-phase or out-phase with the PWM square-wave signal. According to the embodiment of the invention in FIG. 3, the current waveforms are out-phase with the square-wave signal Ssq. According to another embodiment of the invention, a plurality of the illumination units ED1~EDn can be respectively coupled to a respective PWM driving module DM1~DMn by the first terminals and collectively coupled to the ground terminal by the second terminals, in which the current waveforms are analogous with the square-wave signal Ssq.

For the convenience of description, the PWM driving modules DM1~DMn are divided into three groups. As shown in FIG. 4, when the starting values (or predetermined value) of the counter 331 of the PWM driving modules DM1~DMn are 0. The waveform Cv1 shows the current on the power line Vp induced by the first group; the waveform Cv2 shows the current on the power line Vp induced by the second group; the waveform Cv3 shows the current on the power line Vp induced by the third group; and the waveform Cvs shows the current on the power line Vp induced by the first, second, and third groups. The waveform Cv2' shows the current on the power line Vp induced by the second group, in which the starting value Q1 of the counter 331 of the second group is 90, and the waveform Cv3' shows the current on the power line Vp induced by the third group, in which the starting value Q1 of the counter 331 of the third group is 180, wherein the rising edge of the waveform Cv1 is located at the beginning of the display cycle; the rising edge of the waveform. Cv2' and the rising edge of the waveform Cv3' are behind the rising edge of the waveform Cv3; and the waveform Cvs' is the sum of the waveform Cv1, the waveform Cv2', and the waveform Cv3'. Note that by dividing the illumination units into a first group, a second group, and a third group and assigning each group with a different starting value and staggering the illumination periods of the first group, the illumination periods of the second group, and the illumination periods of the third group in a display cycle DP, the current loaded on the power line Vp is distributed throughout the entire display cycle DP instead of being concentrated on a portion of the display cycle DP, and the current distribution is much more even (comparing to the waveform Cvs' with the waveform Cvs). In an embodiment of the invention, the waveform Cv1, the waveform Cv2' and the waveform Cv3' have different phases from one another.

Figure 5:
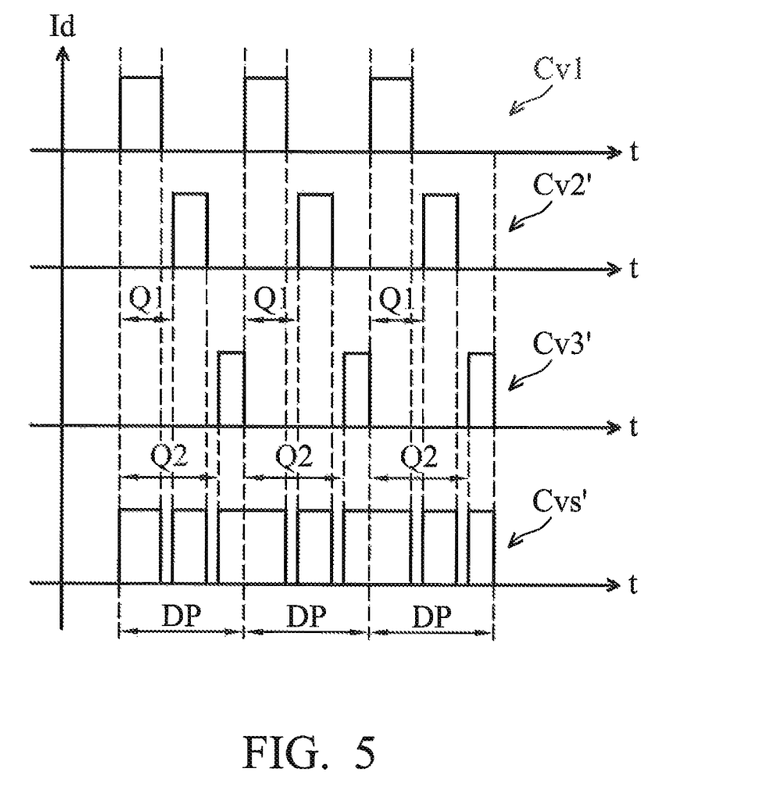
FIG. 5 is a diagram depicting the relationship of the current on the power line versus time according to an alternative embodiment of the invention.

FIG. 5 is a diagram depicting the relationship of the current on the power line versus time according to an alternative embodiment of the invention. According to the PWM driving method, the current waveforms shown in FIG. 5 can be in-phase or out-phase with the PWM square-wave signal. According to the embodiment of FIG. 3, the current waveforms are out-phase with the square-wave signal Ssq. In this embodiment, a plurality of the illumination units ED1~EDn can be respectively coupled to a respective PWM driving module DM1~DMn by the first terminals and collectively coupled to the ground terminal by the second terminals, in which the current waveforms are the same as the square-wave signal Ssq.

As shown in FIG. 5, the waveform Cv1 shows the current on the power line Vp induced by the first group; the waveform Cv2' shows the current on the power line Vp induced by the second group; the waveform Cv3' shows the current on the power line Vp induced by the third group; and the waveform Cvs' shows the total current on the power line Vp induced by the first, second, and third groups, in which the counters of the first, second, and third groups are all up counters with different starting values. In this embodiment of the invention, the rising edge of the waveform Cv1 is located at the beginning of the display cycle DP; the rising edge of the waveform Cv2' is behind the falling edge of the waveform Cv1; and the rising edge of the waveform Cv3' is behind the falling edge of the waveform Cv2'. In addition, the width (duty cycle) of the waveform Cv1, the width of the waveform Cv2', and the width of the waveform Cv3' may be different at different display cycles.

Figure 6:
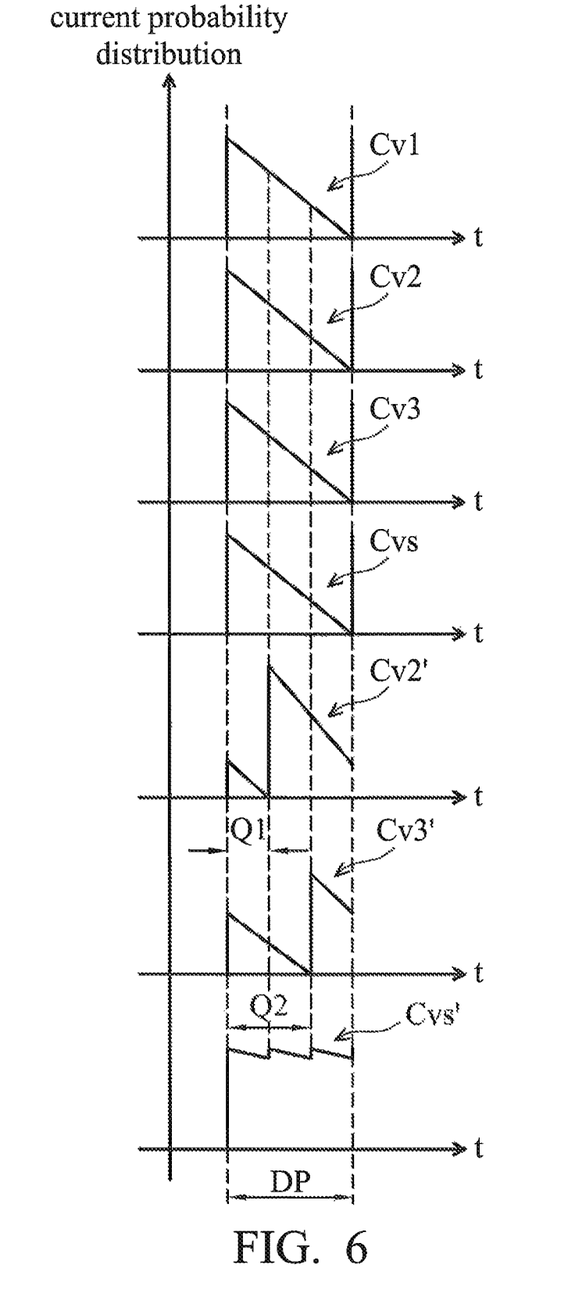
FIG. 6 is a diagram depicting a current probability distribution chart.

FIG. 6 is a diagram depicting a current probability distribution chart. As shown in FIG. 6, the waveform Cp1 shows the current probability distribution on the power line Vp induced by the first group, the waveform Cp2 shows the current probability distribution on the power line Vp induced by the second group, the waveform Cp3 shows the current probability distribution on the power line Vp induced by the third group, and the waveform Cps shows the total current probability distribution on the power line Vp induced by the first, second, and third groups, in which the starting values for the first, second, and third groups are the same. The waveform Cp2' shows the current probability distribution on the power line Vp induced by the second group, in which the starting value Q1 of the counter 331 of the second group is 90. The waveform Cp3' shows the current probability distribution on the power line Vp induced by the third group, in which the starting value Q1 of the counter 331 of the third group is 180. The waveform Cps' shows the total current probability distribution on the power line Vp induced by the first, second, and third groups. Note that by dividing the illumination units into a first group, a second group, and a third group with different phases and staggering the illumination, periods of the first group, the illumination periods of the second group, and the illumination periods of the third group in a display cycle DP, the current loaded on the power line Vp is distributed throughout the entire display cycle DP, thereby reducing the instant peak load on the power line Vp.

Figure 7:
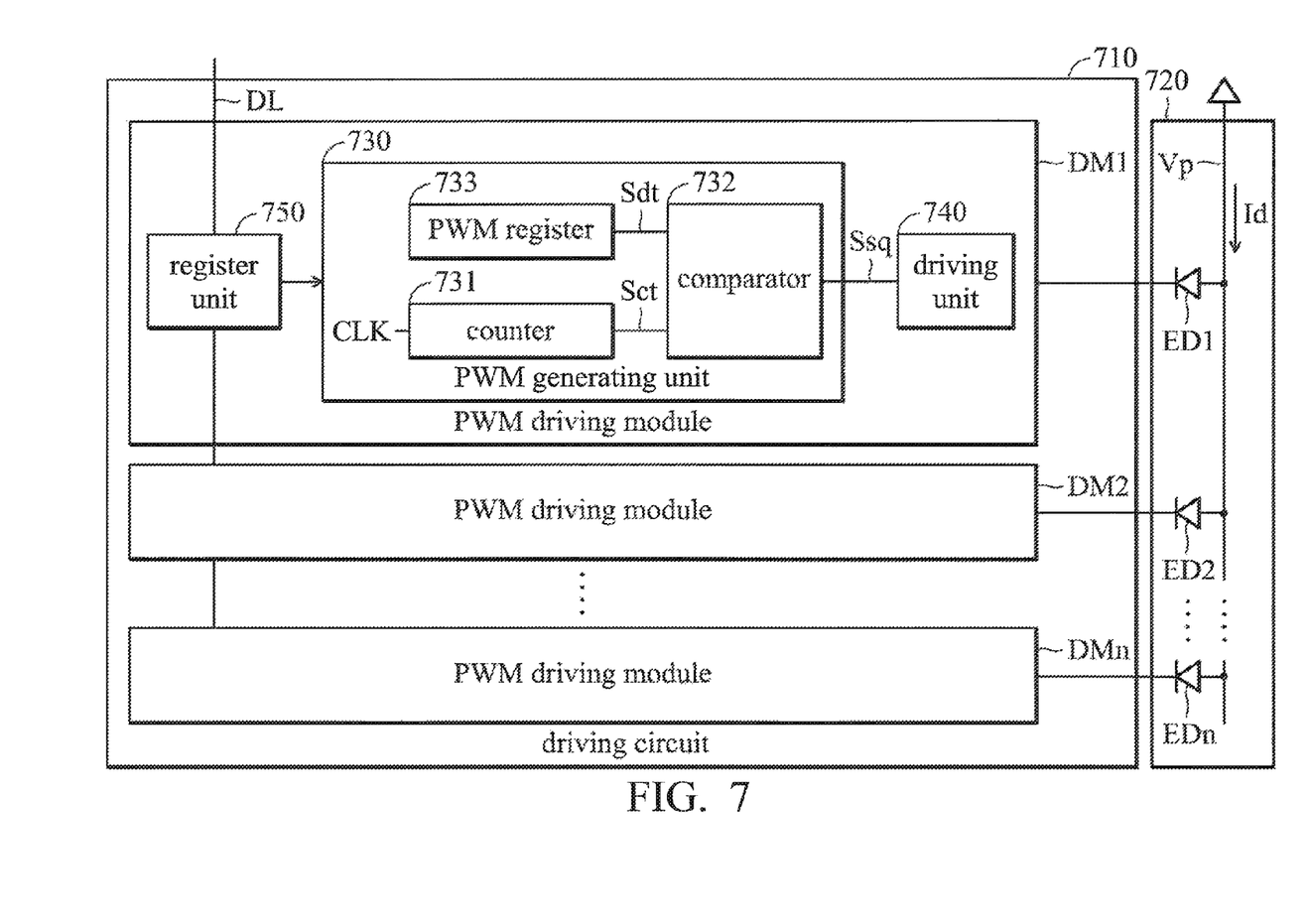
FIG. 7 is a schematic of the driving circuit according to another embodiment of the invention.

FIG. 7 is a schematic of the driving circuit according to another embodiment of the invention. As shown in FIG. 7, the driving circuit 710 is similar to the driving circuit 310, and the difference between the embodiment of FIG. 3 and the embodiment of FIG. 7 is that each of the PWM driving modules DM1~DMn shown in FIG. 7 includes a register unit 750 which buffers the data signal Sdt on the data line DL and outputs the data signal Sdt to a PWM generating unit 730. Each PWM generating unit 730 includes a PWM register 733 which stores the data signal Sdt from the register unit 750 and outputs the data signal Sdt to the comparator 732.

In this embodiment of the invention, the comparator 732 includes a positive terminal coupled to the counter 731 and a negative terminal coupled to the PWM register 733, so that the square-wave signal Ssq is at a high voltage level when the counting signal Sct is higher than the data signal Sdt. In an alternative embodiment of the invention, the comparator 732 includes a positive terminal coupled to the PWM register 733 and a negative terminal coupled to the counter 731, such that the square-wave signal Ssq is at a high voltage level when the data signal Sdt is higher than the counting signal Sct.

Figure 8:
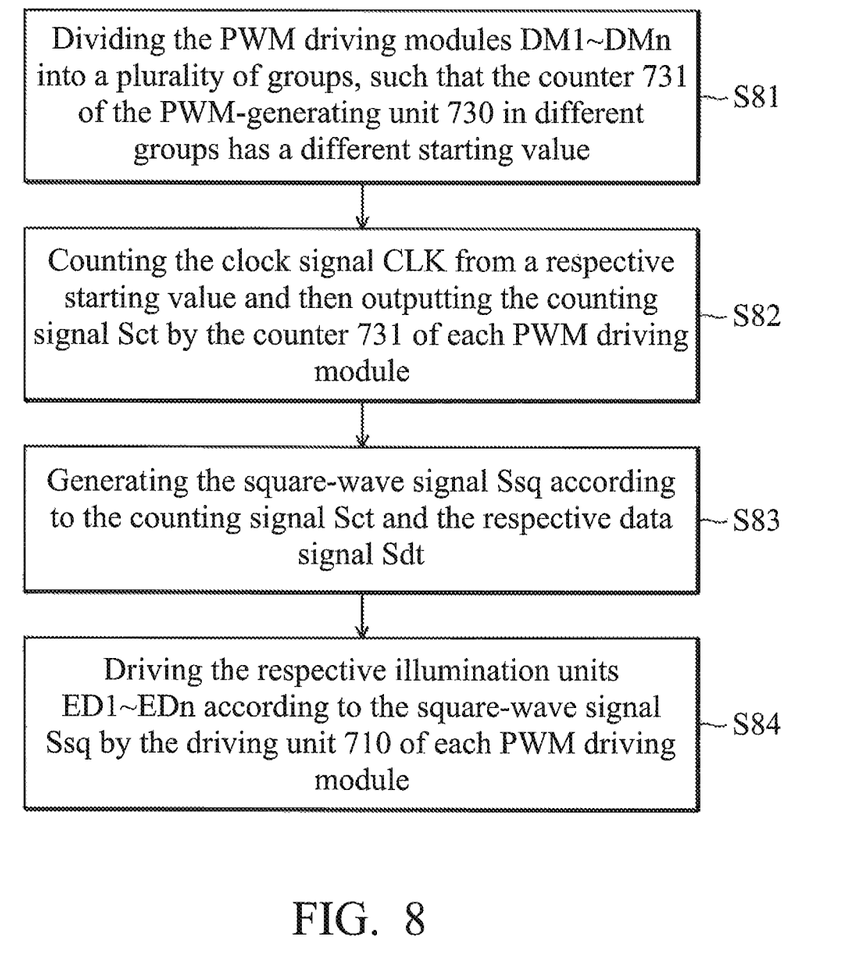
FIG. 8 is a flow chart of the method of driving the illumination unit according to an embodiment of the invention.

FIG. 8 is a flow chart illustrating the method of driving the illumination unit according to an embodiment of the invention. As shown in FIG. 8, the driving method includes the following steps. In step S81, the PWM driving modules DM1~DMn are divided into a plurality of groups, such that the counter 731 of the PWM generating unit 730 in different groups has a different starting value. In Step S82, the counter 731 of each PWM driving module starts counting the clock signal CLK from a respective starting value and then outputs the counting signal Sct. In step S83, the comparator 732 of each PWM driving module generates the square-wave signal Ssq according to the counting signal Sct and the respective data signal Sdt. In step S84, the driving circuit 710 of each PWM driving module drives the respective illumination units ED1~EDn according to the square-wave signal Ssq.

In summary, the counter 331 of each group has a different starting value, and the possibility of all illumination units ED1~EDn being turned on within the first time unit (e.g. UT1) or within the last time unit (e.g. UT255) of the display cycle DP is therefore reduced. Also, the instant peak load on the power line Vp is reduced as well.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A driving circuit, comprising:
a first PWM driving module, generating a first square-wave signal to drive a first illumination unit according to a first data signal of a data stream, wherein the first square-wave signal represents an illumination period of the first illumination unit in a display cycle, wherein a first register unit receives the first data signal and outputs the first data signal to the first PWM driving module; and
a second PWM driving module, generating a second square-wave signal to drive a second illumination unit according to a second data signal of the data stream, wherein the second square-wave signal represents an illumination period of the second illumination unit in the display cycle, wherein a second register unit receives the second data signal and outputs the second data signal to the second PWM driving module, and the first square-wave signal has a different phase with the second square-wave signal,
wherein a width of the first square-wave signal is different from a width of the second square-wave signal.

2. The driving circuit of claim 1, wherein a rising edge of the first square-wave signal is located at the beginning of the display cycle, and a rising edge of the second square-wave signal is behind the rising edge of the first square-wave signal.

3. The driving circuit of claim 1, wherein a rising edge of the first square-wave signal is located at the beginning of the display cycle, and a rising edge of the second square-wave is behind the falling edge of the first square-wave.

4. The driving circuit of claim 1, wherein the first PWM driving module comprises:

a first PWM generating unit, outputting the first square-wave signal according to the first data signal, and a first driving circuit, coupled to the first PWM generating unit, for driving the first illumination unit according to the first square-wave signal, and wherein the second PWM driving module comprises:

a second PWM generating unit, outputting a second square-wave signal according to the second data signal, and a second driving circuit, coupled to the second PWM generating unit, for driving the second illumination unit according to the second square-wave signal.

5. The driving circuit of claim 4, wherein the first PWM generating unit comprises:

a first counter, counting a clock signal to output a first counting signal; and a first comparator, generating the first square-wave signal according to the first counting signal and the first data signal, and wherein the second PWM generating unit comprises:

a second counter, counting the clock signal to output a second counting signal, and a second comparator, generating the second square-wave signal according to the second counting signal and the second data signal, wherein a starting value of the first counter is different from a starting value of the second counter.

6. The driving circuit of claim 4, wherein the first illumination unit is coupled to the second illumination unit in parallel, and a first terminal of the first illumination unit and a first terminal of the second illumination unit are coupled to a power line, a second terminal of the first illumination unit is coupled to the first PWM driving module, and a second terminal of the second illumination unit is coupled to the second PWM driving module.

7. The driving circuit of claim 1, wherein the first PWM generating unit further comprises:

a first PWM register, coupled between the first register unit and the first comparator, for storing the first data signal, and wherein the second PWM generating unit further comprises:

a second PWM register, coupled between the second register unit and the second comparator, for storing the second data signal.

8. The driving circuit of claim 7, wherein the first comparator comprises a positive terminal coupled to the first counter and a negative terminal coupled to the first PWM register, such that the first square-wave signal is at a high voltage level when the first counting signal is higher than the first data signal, and the second comparator comprises a first terminal coupled to the second counter and a negative terminal coupled to the second PWM register, such that the second square-wave signal is at a high voltage level when the second counting signal is higher than the second data signal.

9. The driving circuit of claim 7, wherein the first comparator comprises a positive terminal coupled to the first PWM register and a negative terminal coupled to the first counter, such that the first square-wave signal is at a high voltage level when the first data signal is higher than the first counting signal, and the second comparator comprises a positive terminal coupled to the second PWM register and a negative terminal coupled to the second counter, such that the second square-wave signal is at a high voltage level when the second data signal is higher than the second counting signal.

10. The driving circuit of claim 1, wherein the first illumination unit and the second illumination unit are light-emitting diodes (LEDs).

11. A driving method, driving a first illumination unit and a second illumination unit, comprising:

generating a first square-wave signal according to a first data signal of a data stream, wherein the first data signal is buffered by a first register unit, wherein the first square-wave signal represents an illumination period of the first illumination unit in a display cycle, and a rising edge of the first square-wave signal is located at a beginning of the display cycle;

driving the first illumination unit according to the first square-wave signal;

generating a second square-wave signal according to the second data signal of the data stream, wherein the second data signal is buffered by a second register unit, wherein the second square-wave signal represents an illumination period of the second illumination unit in the display cycle, and a falling edge of the second square-wave signal is located at the end of the display cycle, and wherein the first square-wave signal has a different phase with the second square-wave signal, wherein a width of the first square-wave signal is different from a width of the second square-wave signal; and driving the second illumination unit according to the second square-wave signal.

12. The driving method of claim 11, wherein the rising edge of the first square-wave signal is located at the beginning of the display cycle, and the rising edge of the second square-wave signal is behind the rising edge of the first square-wave signal.

13. The driving method of claim 11, wherein the rising edge of the first square-wave signal is located at the beginning of the display cycle, and the rising edge of the second square-wave signal is behind a falling edge of the first square-wave signal.

14. The driving method of claim 13, wherein the step of generating the first square-wave signal and the step of generating the second square-wave signal comprise:

outputting a first counting signal by counting a clock signal with a first counter;

outputting a second counting signal by counting the clock signal with a second counter;

comparing the first counting signal and the first data signal and in response thereto generating the first square-wave signal; and comparing the second counting signal and the second data signal and in response thereto generating the second square-wave signal, wherein a starting value of the first counter is different from a starting value of the second counter.

15. The driving method of claim 14, wherein the first square-wave signal is at a high voltage level when the first data signal is higher than the first counting signal, and the second square-wave signal is at a high voltage level when the second counting signal is higher than the second data signal.

16. The driving method of claim 14, wherein the first square-wave signal is at a high voltage level when the first data signal is higher than the first counting signal, and the second square-wave signal is at a high voltage level when the second data signal is higher than the second counting signal.

17. The driving method of claim 11, wherein the first illumination unit and the second illumination unit are light-emitting diodes (LEDs).

* * * * *